(12) United States Patent
Wieser

(10) Patent No.: US 11,542,915 B1
(45) Date of Patent: Jan. 3, 2023

(54) CONTINUOUS NON-TIDAL HYDROKINETIC ENERGY TRANSFER RESOURCE WITH MOVEABLE PLATFORM

(71) Applicant: Hydrokinetic Energy Research Associates, LLC, Weston, MO (US)

(72) Inventor: Clifford P. Wieser, Weston, MO (US)

(73) Assignee: Hydrokinetic Energy Research Associates, LLC, Weston, MO (US)

( * ) Notice: Subject to any disclaimer, the term of this patent is extended or adjusted under 35 U.S.C. 154(b) by 0 days.

(21) Appl. No.: 17/815,241

(22) Filed: Jul. 27, 2022

Related U.S. Application Data

(60) Provisional application No. 63/264,755, filed on Dec. 1, 2021.

(51) Int. Cl.
*F03B 17/06* (2006.01)

(52) U.S. Cl.
CPC .......... *F03B 17/065* (2013.01); *F03B 17/063* (2013.01); *F05B 2220/32* (2013.01); *F05B 2240/91521* (2013.01); *F05B 2240/94* (2013.01)

(58) Field of Classification Search
CPC .... F03B 17/063; F03B 17/065; F03B 17/066; F03B 7/00; F03B 7/003; F05B 2220/32
See application file for complete search history.

(56) References Cited

U.S. PATENT DOCUMENTS

| | | | | |
|---|---|---|---|---|
| 1,505,909 | A | * | 8/1924 | Melin .................. F03B 17/063 416/149 |
| 2013/0320680 | A1 | | 12/2013 | Wang |
| 2014/0154050 | A1 | | 6/2014 | Campeanu |

FOREIGN PATENT DOCUMENTS

| | | | |
|---|---|---|---|
| CN | 106870256 | A * | 6/2017 |
| GB | 191301214 | A | 1/1914 |
| GB | 162750 | A | 5/1921 |
| WO | 2006082403 | A1 | 8/2006 |
| WO | 106762353 | A | 5/2017 |

(Continued)

OTHER PUBLICATIONS

SIA Magazin, A 7.5 kW Prototype Poncelet Waterwheel With Maximum Power at 50 RPM, SIA Magazin, Aug. 20, 2018, 2 pages, SIA Magazine of Nering Industries, United States.

(Continued)

*Primary Examiner* — Richard A Edgar
(74) *Attorney, Agent, or Firm* — Coughlin Law Office LLC; Daniel J. Coughlin; Stuart M. Aller

(57) ABSTRACT

A hydrokinetic energy interface device includes a hydrokinetic wheel and a moveable support structure with an angled frame. The angled frame mounted upon the moveable support structure connects between a hydrokinetic wheel and a counterbalance. A bearing is mounted at a vertex between a first end and a second end of the angled frame. The angled frame pivots to move the hydrokinetic wheel and the counterbalance in opposite vertical direction. The hydrokinetic wheel maintains vertical alignment as the angled frame pivots. The hydrokinetic wheel can be formed with interconnectable rim sections. The hydrokinetic wheel may be cantilevered out away from a riverbank by the counterbalance. The hydrokinetic wheel may be raised or lowered by actuation. The movable support structure supporting the hydrokinetic wheel may be rolled away from a free-flowing river for maintenance, repairs, or modification.

20 Claims, 11 Drawing Sheets

(56) References Cited

FOREIGN PATENT DOCUMENTS

WO            106870256 A      6/2017
WO     WO-2019175523 A1 *    9/2019             F03B 11/08

OTHER PUBLICATIONS

Wieser, Clifford P., Alternative Energy Overview, Oct. 23, 2018, 3 pages, Weston, MO, United States.
Wieser, Clifford P., Department of Energy Concept Paper #2, Oct. 23, 2018, 3 pages, Weston, MO, United States.
Wieser, Clifford P., Hydro Kinetic Energy from Non Tidal Rivers, Wikipedia CpWieser/sandbox, Apr. 24, 2021, 1 page, Weston, MO, United States.
Wieser, Clifford P., Hydro Kinetic Scale Models, Pinterest, Published at least as early as Oct. 2018, 8 photos Weston, MO, United States.
Zhejiang Tengrong Environmental Protection Technology Co Ltd, A kind of tower crane type TRT, 5 pages, May 31, 2017, This is a machine translated text of a patent originally published on May 31, 2017 as CN106762353A, China.
张希文, Tower upwelling and down-welling hydrodynamic force water turbine power station, 4 pages, Jun. 20, 2017, This is a machine translated text of a patent originally published on Jun. 20, 2017 as CN106870256A, China.

\* cited by examiner

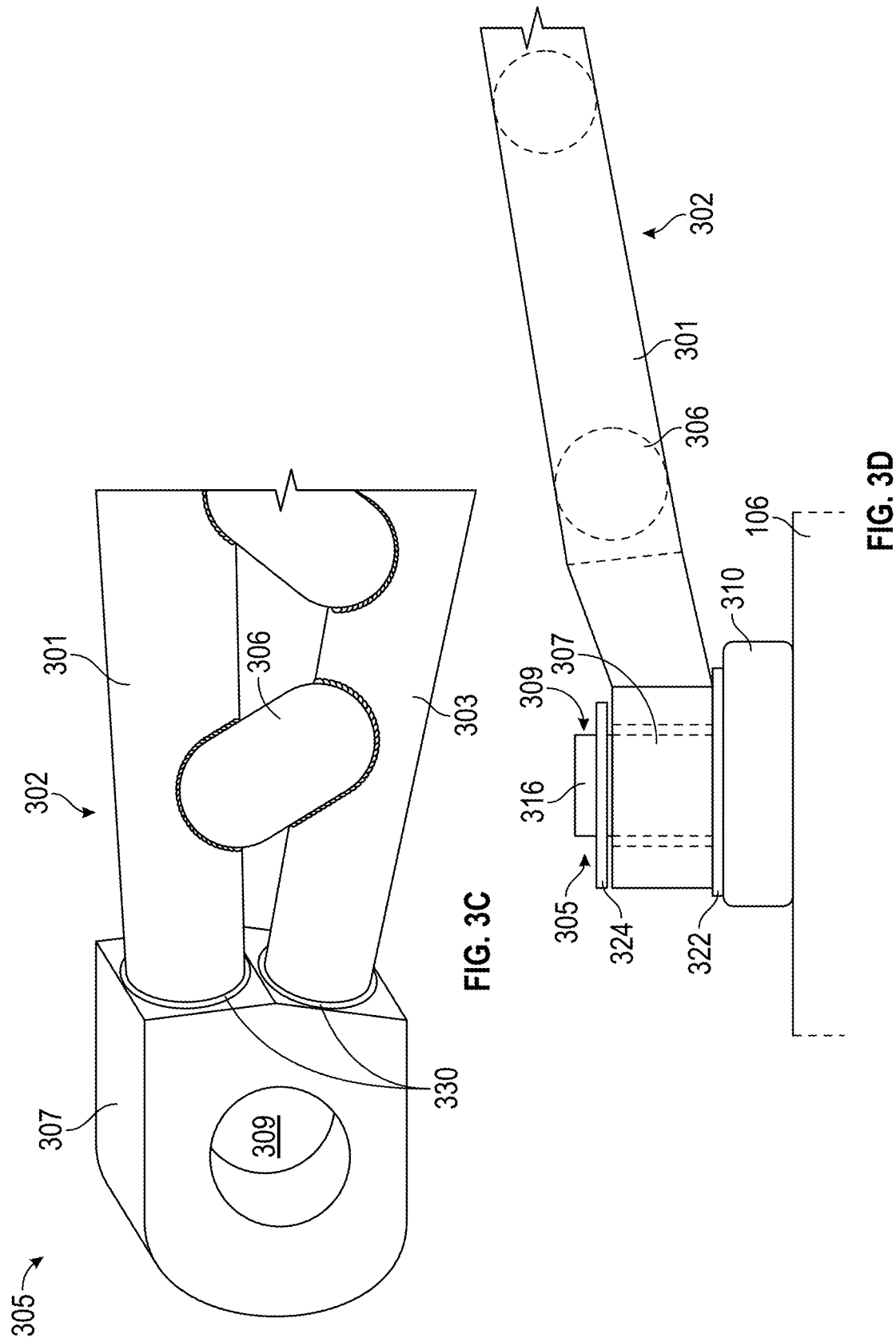

CONTINUOUS NON-TIDAL HYDROKINETIC ENERGY TRANSFER RESOURCE WITH MOVEABLE PLATFORM

CROSS REFERENCES

This application claims the benefit of U.S. Provisional Application No. 63/264,755, filed 1 Dec. 2021.

REFERENCE TO RESEARCH

Not Applicable.

REFERENCE TO CDS

Not Applicable.

TECHNICAL FIELD

The present disclosure relates to machines or engines using liquid flow, such as from a free-flowing river, to convert kinetic energy with a hydrokinetic wheel having a rotation axis substantially at right angle to flow direction, the flow engaging parts having a cyclic movement relative to the rotor during its rotation.

BACKGROUND

A wide range of hydraulic machines exist for transferring energy from naturally available free-flowing water to hydrokinetic assemblies equipped with generators or pumps. These systems transform hydrokinetic energy into other useable formats. Other fluid mediums may be used to power hydraulic machines such as wind, steam, or other flowing amorphous substance.

SUMMARY

The disclosed hydrokinetic energy transfer apparatus can capture and convert vast amounts of fuel-free clean energy when in operation. The apparatus provides a cost-effective alternative for reduction in carbon dioxide pollution. In addition, other noise, light, and inaesthetic problems caused by modern green alternatives implemented in energy transformation operations are reduced.

A modular version of the hydrokinetic energy transfer apparatus allows for easy replication of the components. The modular hydrokinetic assembly comprises a large diameter hydrokinetic water wheel having around 36 large, curved blades. Several different output sizes may be designed dependent on the free-flowing water source available. The design features of the apparatus allow for a large mechanical structure. Component materials and apparatus configuration benefit the large mechanical structure with a longer unit lifetime. Easy duplication of components provides the ability to implement multiple apparatus into an efficient array along a free-flowing river.

Hydrokinetic energy transfer apparatus may be advantageously installed along long and continuous flowing rivers. In the contiguous United States, the large Missouri and Mississippi Rivers have continuously moving water flowing year-round. Alternatively, the apparatus may be sited adjacent to an intermediate-sized river or fast flowing, large diameter drain(s) where large areas of surface runoff combine.

Municipalities sited near rivers can use the hydrokinetic energy transfer apparatus to control their own independent electrical grid and services. The water wheel converts the inertia from tons of moving water into clean energy for municipalities while running slowly, quietly, and smoothly.

Hydrokinetic energy transfer apparatus has a support structure and a frame that are moveable. The frame is angled and pivotally mounted to the support structure. The frame has a first end connected to the hydrokinetic wheel and a second end connected to a counterbalance. A vertex exists between the first end and the second end. A bearing is located at the vertex and rotatably mounted between the frame and the support structure. The frame is adapted to move the hydrokinetic wheel and the counterbalance in opposite vertical direction. The hydrokinetic wheel is maintained in vertical alignment as the frame pivots. The hydrokinetic wheel may be formed with interconnectable rim sections. The hydrokinetic wheel rotates on a shaft with a large amount of torque at a dependable speed. The frame of the apparatus may be cantilevered out away from the riverbank by the counterbalance to simplify elevation changes of the hydrokinetic wheel. The cantilevered hydrokinetic wheel is also raised by actuation before a movable platform supporting the apparatus is rolled away from the free-flowing river for maintenance, repairs, or modification.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

Aspects are illustrated by way of example, and not by way of limitation, in the accompanying drawings, wherein:

FIG. 3C shows a close-up perspective view of a pivot end portion of the first framework depicted in FIG. 3A.

FIG. 3D shows a bottom-up view of the pivot end of FIG. 3C connected to a support linkage supporting a shaft case.

DETAILED DESCRIPTION

Figure 1:
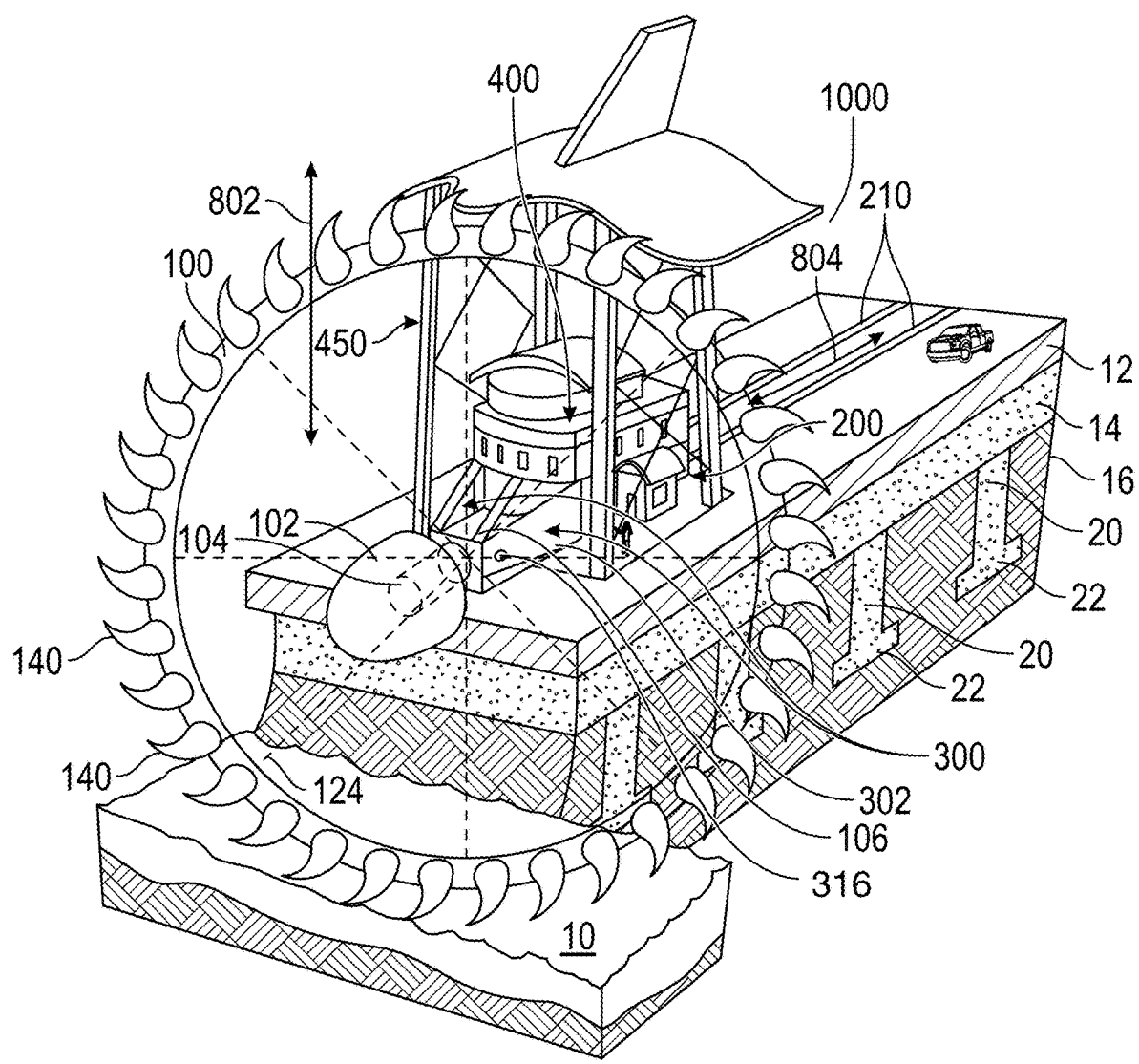
FIG. 1 shows a front, top-down perspective view of an example hydrokinetic energy transfer apparatus on a moveable platform sited along a free-flowing water surface.

A hydrokinetic energy transfer resource—apparatus 1000— installed along an alluvial river such as a river 10 shown in FIG. 1. The apparatus 1000 comprises a support structure 400 including a platform 200, a frame 300, a hydrokinetic wheel 100, and a counterbalance 600 (better shown in FIG. 2). The hydrokinetic wheel 100 is adapted to raise away and lower towards the river along vertical movement arrow 802 as shown in FIG. 1. The apparatus 1000 is adapted to move towards and away from the river along horizontal movement arrow 804 as shown in FIG. 1. The frame 300 is longitudinally aligned with the horizontal movement of the moveable support structure. Wheels 202 connected to a platform 200 of the apparatus 1000 may be positioned on rails, a track, or a pair of parallel tracks. The track 210 extends perpendicularly away from the flow path of the river 10. Vertical structures 450 may cover a portion of the frame 300.

Figure 2:
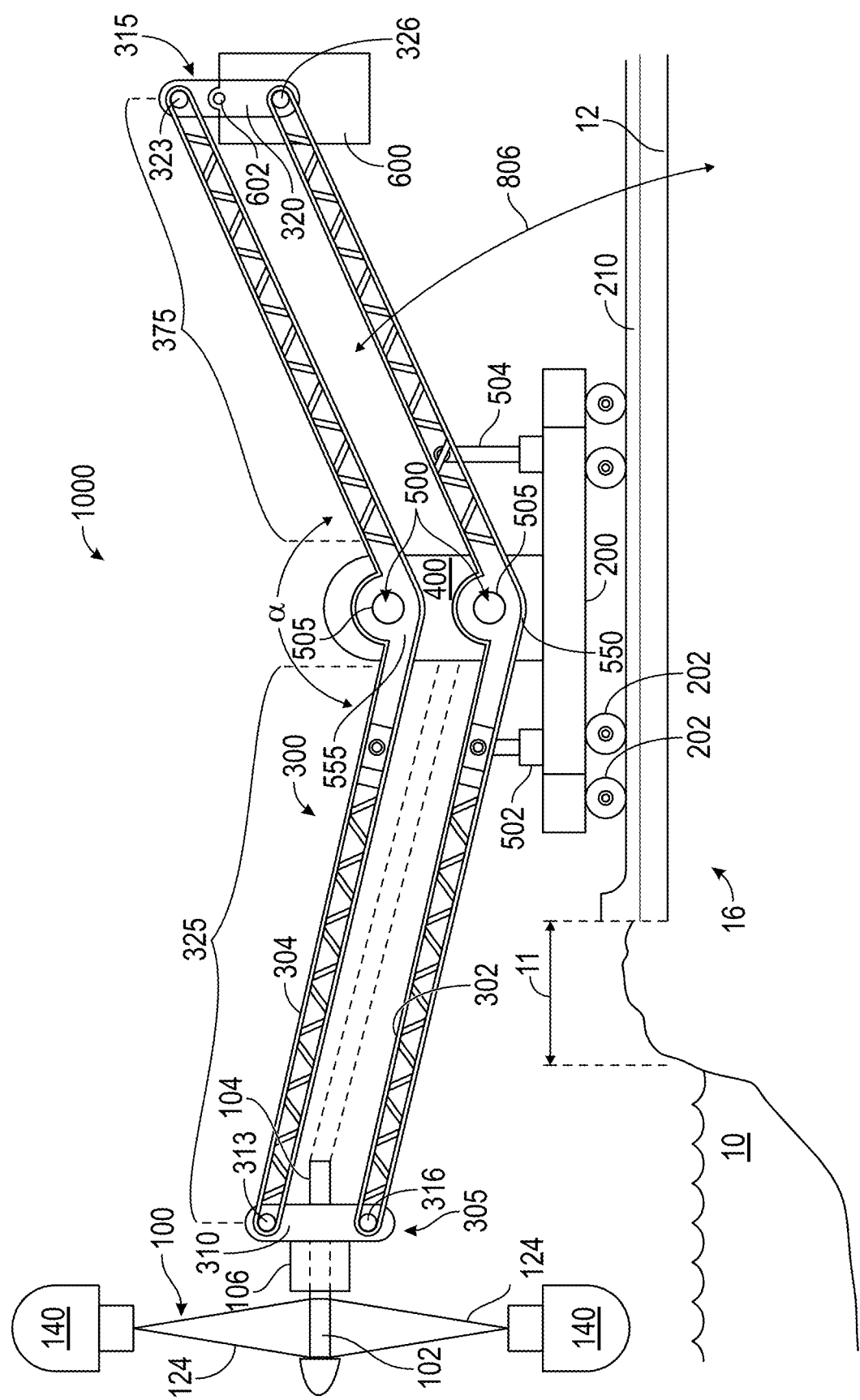
FIG. 2 shows a side perspective view of a pivotable frame on a moveable platform supporting a hydrokinetic wheel and counterbalance in a neutral position.

Referring now to FIG. 2, an example of the apparatus 1000 is shown where the frame 300 is pivotably mounted to a support structure 400 that is moveable. The support structure 400 extends vertically in an upright position from the underlying platform 200. A central pivot 500—pivot point—may be fixed to the support structure 400 upon which a bearing 505 that is rotatable can be mounted. The bearing 505 may encircle the central pivot 500. A bearing may be disposed at each of a lower vertex 550 and an upper vertex 555 of the frame. The lower and upper vertex 550, 555, respectively, may be situated in a portion of the frame 300 where lines of a first arm 325 and second arm 375 of the frameworks meet. Alternatively, the central pivot 500 may be a component of the frame 300 and pass through a bearing mounted within the support structure 400. The central pivot 500 may be a cylindrical joint or shaft that is greased. The hydrokinetic wheel 100 is connected to the first end 305 of frame 300. The counterbalance 600 is connected to the second end 315.

The frame 300 is adapted to pivot upon the central pivot 500 about a horizontal axis 408 that is perpendicular to the axis of rotation of the hydrokinetic wheel 100. The frame 300 may move in an arcuate motion, as represented by arcuate movement arrow 806. Upon frame 300 movement, hydrokinetic wheel 100 and the counterbalance 600 may move in opposite vertical direction, as represented by vertical movement arrow 802 (shown in FIG. 1). Such motion may decrease the site spacing needed for positioning of the hydrokinetic wheel 100 for maintenance. Generally, the first and second ends 305, 315 of the frame 300 may be no lower than the lower vertex 550 during the pivot action. The first arm 325 and second arm 375 of the frame 300 may become parallel with the platform 200 when the frame 300 fully pivots.

Having the vertex 550, 555 generally below the first end 305 and the second end 315 of the frame 300 raises the position of the hydrokinetic wheel 100 and counterbalance 600 away from the foundation surface 12. Weights of the hydrokinetic wheel 100 and counterbalance 600 may be proportionally sized relative to one another to balance the framework for easier, energy efficient pivots. In one example, the weight of the counterbalance 600 may be up to 15 percent greater in weight than the hydrokinetic wheel 100. Alternatively, the weights of the hydrokinetic wheel 100 and counterbalance 600 may be of equal weight to maintain a substantially balanced apparatus 1000.

As shown in FIG. 2, the first end 305 and the second end 315 of the frame 300 are disposed above the central pivot 500 in a generally neutral-balanced position. The first end 305 and the second end 315 are positioned generally across from one another. An overall lower center of gravity of the apparatus 1000 is created by a frame 300 having a central pivot 500 that is generally lower than the first and second ends 305, 315. Reduction in the vertical height of the support structure 400 may allow greater stability and greater mobility of movement and size variations available in the design of the hydrokinetic wheel 100. Alternatively, the relative weights of the hydrokinetic wheel 100 and counterbalance 600 may be dependent on relative lengths selected for a first arm 325 and second arm 375 of the frame 300.

The frame 300 may comprise single, double, or multiple truss-like frameworks of simple yet sturdy design to support the large weights placed on either end of the frame 300. Compressional and tensional forces act through the truss-like framework when large weights such as the hydrokinetic wheel 100 and counterbalance are placed on ends of the first arm 325 and the second arm 375, respectively. As will be described in more detail below, frame 300 pivots on the support structure 400. A pivoting frame causes the first end 305 and second end 315 to move in opposite vertical directions. In this way, the hydrokinetic wheel 100 can be lowered into or raised out of the water using the counterbalance 600 as a stabilizer. The vertical position of the hydrokinetic wheel 100 may also be adjusted based on the water level to optimize generating capacity of apparatus 1000. The first arm 325 and second arm 375 of the frame 300 may be of equal length. Alternatively, the first arm 325 and second arm 375 may be sized in accordance with site constraints or the relative weights of the hydrokinetic wheel 100 and counterbalance 600.

As shown in FIG. 2, the frame 300 includes a first lower framework 302 and a first upper framework 304. The first lower framework 302 may comprise two parallel beams connected at each end. The first upper framework 304 may also comprise two parallel beams connected at each end. The first lower framework 302 is vertically displaced below the first upper framework 304. Each of the framework arms may extend from a respective vertex 550, 555 to form an angle alpha (α) that may be less than 180°. Angle alpha (α) may be an obtuse angle for each of the plurality of frameworks utilized for the apparatus 1000. Alternatively, the frameworks may be linear or curved upward with ends of the framework raised above the valley of the curve. Together, the first lower framework 302 and the first upper framework 304 form a double chevron shape where the vertex 550, 555, respectively, of each angled framework is between the framework ends. Vertical displacement between the first upper framework 304 and the first lower framework 302 may assist the hydrokinetic wheel 100 in maintaining vertical alignment while the frame 300 pivots.

The first lower and first upper frameworks 302, 304, respectively, have a first arm 325 and a second arm 375. On the first lower framework 302, the portion where the first arm 325 and the second arm 375 meet defines the lower vertex 550. On the first upper framework 304, the portion where the first arm 325 and the second arm 375 meet defines the upper vertex 555. Compressional and tensional forces may act through arms of the first lower framework 302 by placement of a hydrokinetic wheel 100 and counterbalance 600 on the first end 305 and second end 315. Compressional and tensional forces may be proportionally offset by opposing forces acting through arms of the first upper framework 304 when linked with framework ends of first lower framework 302.

Lengths of the first arm 325 and the second arm 375 may increase or decrease based on site spacing or energy requirements for a selected size of apparatus 1000. The weight of each arm may range from 225 kilograms per meter (approx. 150 pounds per foot) to 1000 kilograms (approx. 650 pounds per foot). In a basic example, a first arm 325 and a second arm 375 having equal length and weight may extend approximately 20 meters (approx. 65 feet) away from the bearing 505 at the central pivot 500. The combined weight of the first arm 325 and a hydrokinetic wheel 100 connected thereto may be 23 metric tons (approx. 26 tons). The combined weight of the second arm 375 and a counterbalance 600 connected thereto may be 26 metric tons (approx. 29 tons). With a larger apparatus, a first arm 325 and a second arm 375 having equal length and weight may extend approximately 30 meters (approx. 100 feet) away from the bearing 505 at the central pivot 500. In a more complex example, site location for the apparatus 1000 may dictate having a first arm 325 and a second arm 375 with unequal lengths and weights. In this scenario, the combined weight of a first arm 325 having a length of 40 meters (approx. 130 feet) and a hydrokinetic wheel 100 connected thereto may be 47 metric tons (approx. 52 tons), while the combined weight of the second arm 375 having a length of 25 meters (approx. 80 feet) and a counterbalance 600 connected thereto may be 72 metric tons (approx. 79 tons). There may be siting locations where bank conditions prohibit near river placement of the platform 200. For example, where erosion or undercutting of the bank is a concern, a platform 200 of the apparatus 1000 may be positioned beyond a 30-meter (approx. 100 feet) reach of the river's edge. In this example, a first arm 325 of the apparatus 1000 may have a span of over 50 meters (approx. 175 feet) that extends away from the platform over 35 meters (approx. 120 feet) when in the raised position. Alternatively, the first arm 325 and the second arm 375 may be made telescopic for extending arms to a selected length.

The moveable support structure may comprise the platform 200, wheels 202 connected below the platform 200, and the support structure 400 connected above the platform 200. The moveable support structure is adapted to move the frame 300 away from the river 10 along an axis perpendicular to a flow path of the river 10. The wheeled platform may be adapted to move the support structure 400 upon a pair of tracks 210 that are parallel. A terminal end of the tracks 210, the moveable support structure, or a foundation of the apparatus 1000 may be placed approximately 10 meters (32.8 feet) away from the riverbank to meet United States Army Corp of Engineers specifications. As shown in FIG. 2 by span 11, the specifications may be based on an annual, mean high water level measurement. The platform 200 of the apparatus 1000 may be supported by one or more train flatcars. Movement of the platform 200 may accommodate positioning of the apparatus 1000 to meet the specifications of the span 11 required.

The hydrokinetic wheel 100 may be moved into a raised position or a lowered position. A linear actuator may adjust the position of the hydrokinetic wheel 100 based on a current surface level of the river, a mean high-water level, or an average annual water level. The linear actuator may be mounted to the platform 200 and the frame 300. As shown, a first actuator 502 is mounted between the platform 200 and the first arm 325 of the first lower framework 302 on the hydrokinetic wheel 100 side of the apparatus 1000. A second actuator 504 is mounted between the platform and the second arm 375 of the first lower framework 302 on the counterbalance 600 side of the apparatus 1000. The first and second actuator 502, 504 may be operably connected between the platform 200 and the frame 300 to pivot the frame 300, thereby moving the hydrokinetic wheel 100 vertically. Hydraulic actuators shown are driving pistons, where each piston may be mounted to a respective arm. Alternatively, the pivot maneuver of the frame 300 may be driven electrically, pneumatically, mechanically, or by other means.

Figure 3A:
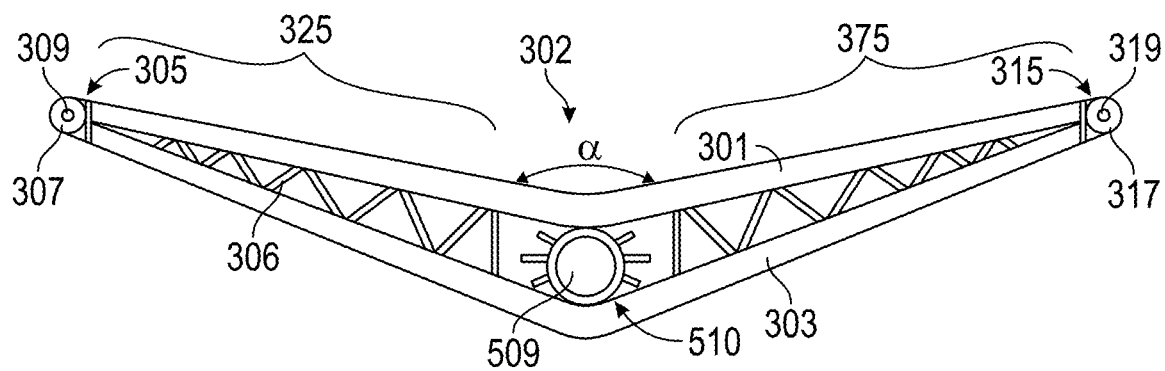
FIG. 3A shows a side perspective view of a first framework of the pivotable frame.

Referring now to FIG. 3A, a side-level view of a first framework is shown. The first framework may serve as the first lower framework 302, a second lower framework 312, the first upper framework 304, and a second upper framework 314 (not shown), or a combination of any or all frameworks. As shown, the first lower framework 302 may form a quadrilateral shape that has an upper concave portion. First lower framework 302 comprises an upper framework member 301 and a lower framework member 303. Upper framework member 301 and a lower framework member 303 have a central bend. The framework's shape may provide structural benefits in supporting, moving, and positioning of the hydrokinetic wheel 100. The upper and lower framework members 301, 303, respectively, may be formed from hollow or solid beams of steel, solid fiberglass tubes, rods, and strips, or structural pultrusions of fiber reinforced polymers such as carbon fiber. The structural materials presented may be used each alone or in any combination to form a framework for the frame 300.

A plurality of transverse members 306 are shown mounted between upper and lower framework members 301, 303, respectively. The plurality of transverse members 306 may be secured to a surface of the upper and lower framework members 301, 303, respectively, between the support end braces 307, 317. The transverse members 306 may be placed at diagonal angles between the framework members to form alternating triangular units to add structural stability to the pair of upper and lower framework members 301, 303, respectively. Transverse members 306 are shown mounted between upper framework member 301 and lower framework member 303 beginning generally from the central pivot 500 extending outwards towards the first end 305 and the second end 315. The transverse members 306 may reduce torsional forces on the first lower framework 302.

Figure 3B:
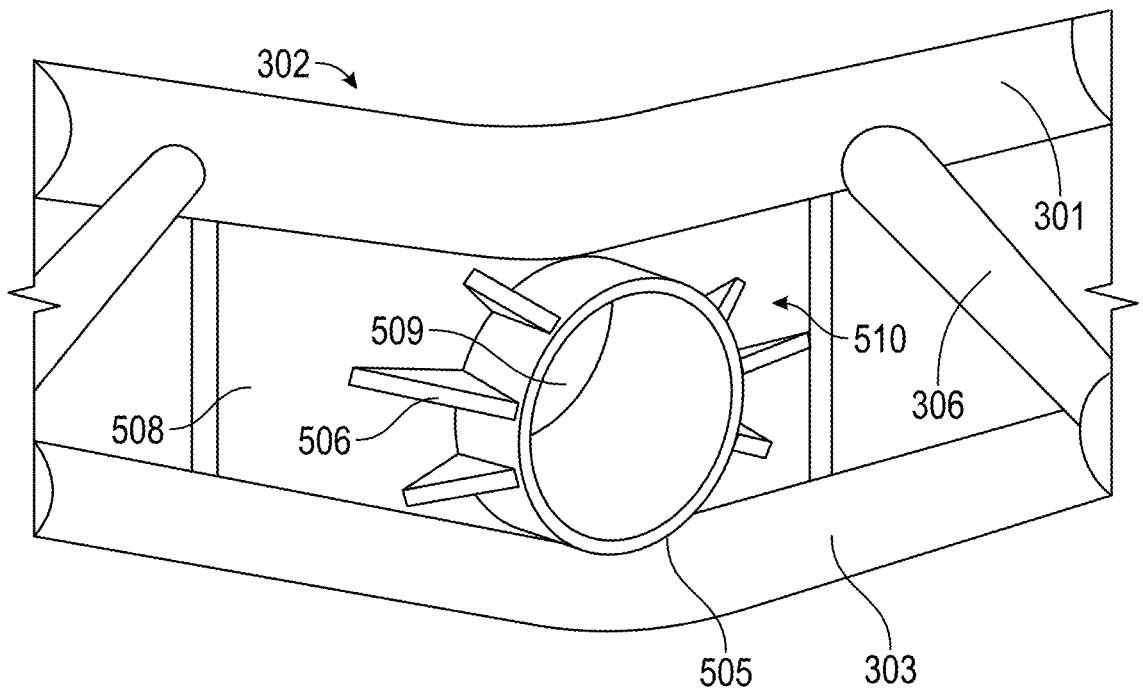
FIG. 3B shows a close-up perspective view of a central pivot aperture portion of the first framework depicted in FIG. 3A.

Referring now to FIG. 3B, a close-up view of a central portion 510 of the first lower framework 302 is shown. The central portion 510 of the first lower framework 302 may comprise a central pivot aperture 509. Central pivot aperture 509 may be a spherical aperture disposed through a bearing plate 508 within the first lower framework 302. The bearing plate 508 may be centrally mounted between the upper framework member 301 and the lower framework member 303. The bearing plate 508 may be a plate of metal (such as steel), solid fiberglass, or carbon fiber structurally reinforced with resin. The central pivot aperture 509 may be encircled by a bearing 505 that is a hollow cylindrical sleeve, bushing, or spherical roller bearing disposed upon the bearing plate 508. As shown in FIG. 3B, a plurality of buttress members may extend outwards away from the bearing plate 508 to provide structural support to the cylindrical sleeve of the bearing 505. A buttress member 506 may be cut from similar material as the bearing plate 508. The buttress member 506 may form a right triangle that is abutted against a surface of the bearing plate 508 and the cylindrical sleeve of the bearing 505 and welded therebetween. Alternatively, the bearing 505 may be mounted within the central pivot aperture 509 disposed through the bearing plate 508. A spherical roller bearing may be rotatably mounted to the support structure 400 by receipt of a cylindrical shaft or bushing mounted to the support structure 400. The rotatable spherical roller bearing can provide low friction movement between the first lower framework 302 and the central pivot 500.

Referring now to FIG. 3C, a close-up view of a first end 305 of the first lower framework 302 is shown. An end of the first lower framework 302 may comprise a pivot end aperture 309, 319. Pivot end aperture 309, 319 may be a spherical aperture disposed through and encircled by a support end brace 307, 317. The support end brace 307, 317 may be a collar of durable material such as metal, solid fiberglass, or carbon fiber structurally reinforced with resin to encircle a shaft 316, 326, respectively. The support end brace 307, 317 may connect the upper framework member 301 and the lower framework member 303. The support end brace 307, 317 may be mounted where the ends of the upper framework member 301 and the lower framework member 303 join. The lower and upper framework members 301, 303, respectively, may extend radially out and away from the support end brace 307, 317. The ends of the upper framework member 301 and the lower framework member 303 may connect at the joints 330 with a support end brace 307, 317.

Referring now to FIG. 3D, a detailed view of a support end assembly. FIG. 3D shows how the hydrokinetic wheel 100 may be maintained in a generally upright orientation while attached to the pivoting upper and lower frames. To accomplish this, the support end assembly has a support end brace. As shown, the support end brace 307 is connected via a linkage 310 to the shaft case 106. As shown, a shaft 316 is connected to the shaft case 106. Shaft 316 passes through the linkage 310. Shaft 316 is received into the pivot end aperture 309 of the support end brace 307. Thrust bearings 322, 324 may be secured against outer faces of the support end brace 307 to retain the support end brace 307 on the shaft 316.

Similarly, a shaft 602 may be connected to the counterbalance 600. The shaft 602 passes through a linkage 320. As shown in FIG. 2, shaft 602 connects directly to the linkage 320. Shaft 602 is connected to the linkage between the first lower framework 302 and the first upper framework 304. Alternatively, shaft 602 may pass through the linkage 320 and be received into a pivot end aperture 319 of support end brace 317. In this scenario, thrust bearings may be secured against outer faces of the support end brace 317 to retain the support end brace 317 on shaft 602. The thrust bearings may serve as a type of large washer between the support end brace 307, 317 and the linkage 311, 320 to reduce friction between pivoting parts. A spherical roller bearing (not shown) may be rotatably mounted within the pivot end aperture 309, 319 of the support end brace 307, 317 to provide low friction movement between the framework ends and the support end assembly.

Figure 4:
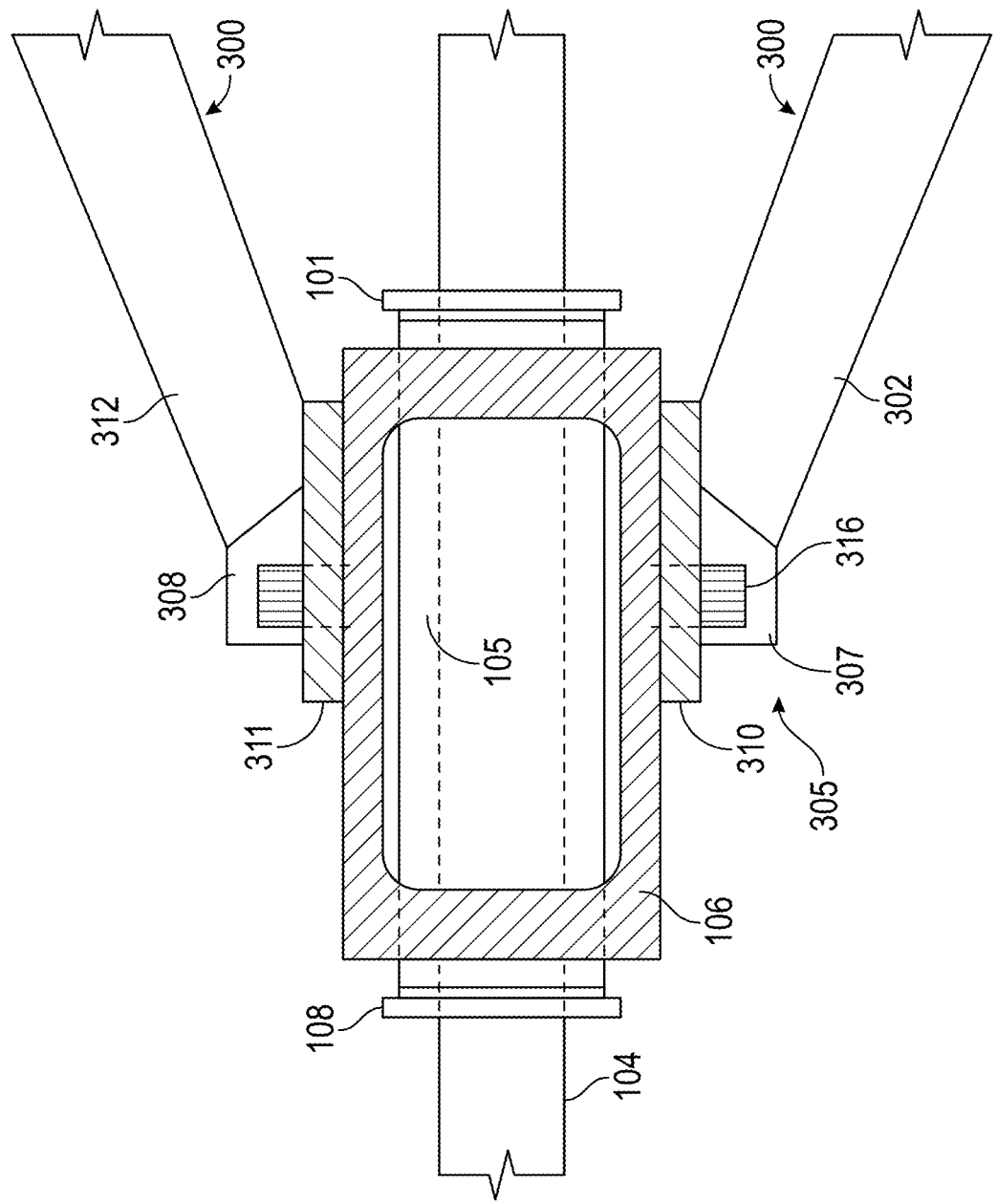
FIG. 4 shows a top-down view of a shaft case situated between adjacent pivot ends of a first framework and a second framework displaced horizontally apart.

Referring now to FIG. 4, rotation of the hydrokinetic wheel 100 is transferred to the generator 700 via a rotating shaft 104. The rotating shaft 104 passes through a shaft case 106 so that energy may be transferred in a variety of hydrokinetic wheel 100 elevation positions. The shaft case 106 is shown supported between support end assemblies of the first lower framework 302 and a second lower framework 312. Support end assemblies may comprise support end braces 307, 308 and linkages 310, 311 of the first lower framework 302 and second lower framework 312, respectively. Vertical alignment of the linkages may be maintained as an inward or outward force from the support end braces occurs. The inward or outward force applied by the support end braces may occur during a change in the pitch of the first lower framework 302 and second lower framework 312 as the frame 300 undergoes a pivoting action. The first lower framework 302 and second lower framework 312 may be spaced horizontally apart. Support end braces 307, 308 of the first lower framework 302 and second lower framework 312 may lie adjacent to the shaft case 106 or linkages 310, 311, respectively. In order to mount the shaft case 106 to linkages 310, 311, shaft 313, 316 may be secured to shaft case 106. Shaft 313, 316 may pass horizontally through apertures disposed through linkage 310, 311 as shown in FIG. 2. Shaft 316, 326 may be received by pivot end apertures 309, 319, respectively, disposed through support end braces 307, 317 as shown between FIG. 2 and FIG. 3A. Shaft 323, 326 may pass horizontally through apertures disposed through linkage 320 as shown in FIG. 2.

The shaft case 106 is operable to maintain alignment of the rotating shaft 104 with the rotating axis of the wheel hub 102. The shaft case 106 maintains proper horizontal alignment of the rotating shaft 104 when the hydrokinetic wheel 100 is moved between a variety of vertical positions. FIG. 4 depicts a shaft case 106 in cutaway format to show a shaft sleeve 105. The rotating axis for the portion of the rotating shaft 104 lying within the shaft sleeve 105 may align with the rotating axis of the hydrokinetic wheel 100. Alternatively, the rotating shaft 104 may incorporate universal joints such that the rotating axis of the portion of the rotating shaft 104 lying outside the shaft sleeve 105 is not aligned with the rotating axis of the hydrokinetic wheel 100. Thrust bearings 101, 108 may retain the position of the shaft sleeve 105 along the rotating shaft 104. The shaft assembly comprising the rotating shaft 104, shaft sleeve 105, and shaft case 106 may maintain horizontal longitudinal alignment as the support end assemblies pivot upon the shaft 316.

Figure 5:
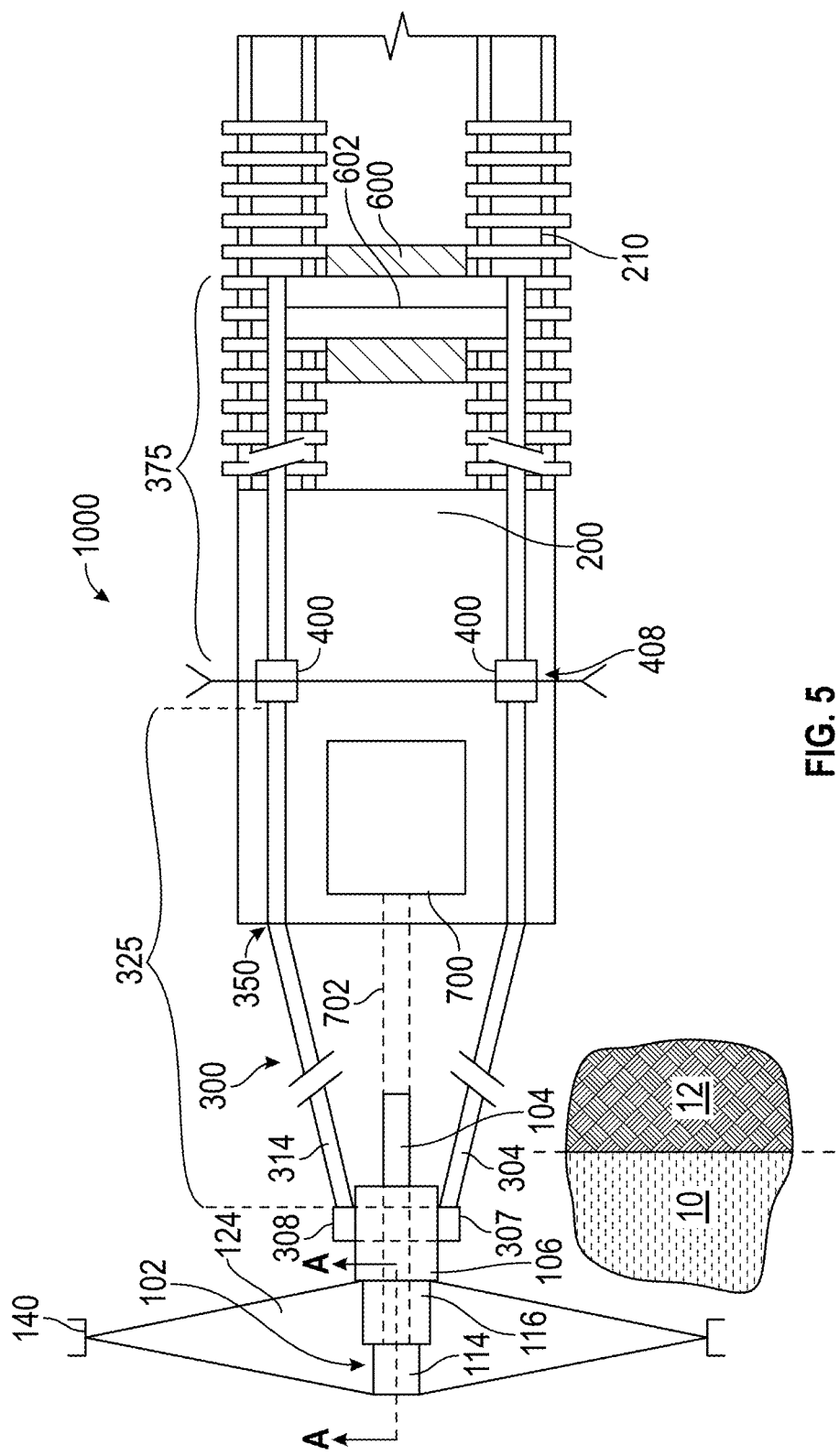
FIG. 5 shows a top-down view of an example hydrokinetic energy transfer apparatus on a moveable platform sited along a free-flowing water surface.

Referring now to FIG. 5, a top-down view of an example of the apparatus 1000 is shown on a moveable support structure sited along a river 10. A first end of the rotating shaft 110 may be disposed through a wheel hub 102 of the hydrokinetic wheel 100. The rotating shaft 104 rotates when the hydrokinetic wheel 100 rotates. Alternatively, the rotating shaft 104 may be operable to selectively disengage from the rotating hydrokinetic wheel 100 for maintenance or safety scenarios. A second end of the rotating shaft 104 is connected to a generator 700. The rotating shaft 104 transfers rotational energy from the hydrokinetic wheel 100 to the generator 700. The generator 700 may be powered by the rotating shaft 104 to convert mechanical energy into electrical energy. Electrical energy produced may be stored in a device such as a capacitor or battery. Alternatively, the rotating shaft 104 may be connected to a compressor or pump to convert mechanical energy from the free-flowing water. Converted mechanical energy may be utilized to pump fluids such as water for irrigating surrounding fields or store compressed air for powering pneumatic equipment.

The rotating shaft 104 may extend in a general linear direction when the hydrokinetic wheel 100 is in a lowered position. The rotating shaft 104 may extend in a non-linear direction when the hydrokinetic wheel is in a raised position. Universal joint(s) 702 (symbolized with dashed lines in FIG. 5) may be utilized for angled portions of the rotating shaft 104 lying outside the shaft case 106. When pivoting the frame 300, universal joint(s) 702 may accommodate elevation and angle changes for portions of the rotating shaft 104 lying between the shaft case 106 and the generator 700.

Therefore, vertical displacement distance between the wheel hub 102 and the generator 700 is spanned by the rotating shaft 104. A pair of universal joints, or a plurality of cooperative universal joints, may be used to join two or more segments of the rotating shaft 104 together. Use of universal joint(s) 702 allows for the rotating shaft 104 to be powered by the hydrokinetic wheel 100 at raised and lowered positions that may vary with the rise and fall of the water level of the river 10. In varying positions, the rotating shaft 104 longitudinally aligns with the frame 300 along the axis of rotation of the hydrokinetic wheel 100. This alignment configuration may increase overall efficiency and life of the apparatus 1000 while simplifying engagement and disengagement of the hydrokinetic wheel 100 with the free-flowing water interface.

The angular shape of the frame 300 may provide extra strength to support the weight of the hydrokinetic wheel 100 and counterbalance 600. The forces acting through the frame 300 from weight of the hydrokinetic wheel 100 may be counteracted by the angular shape. The first arms 325 of the first upper framework 304 and the second upper framework 314 may deflect towards the shaft case 106 at deflection point 350. As shown in FIG. 5, first arms 325 of the first and second upper frameworks 304, 314, respectively, generally lie along lines parallel and adjacent to one another above the platform 200. Similarly, second arms 375 of the first and second upper frameworks 304, 314, respectively, may generally lie along lines parallel and adjacent to one another above the platform 200. A general layout of parallel arms positioned above the outer edges of the platform 200 may provide additional space for equipment such as the generator 700. At deflection point 350, first arms 325 of the first and second upper frameworks 304, 314, respectively, angle together to form an acute angle, as seen from above. The arms join with shaft case 106 at the support end assemblies. The deflection point 350 may occur at any point along the frame 300 such as the vertex 550, 555. A second deflection point (not shown) may exist along second arms 375 of the first upper framework 304 and the second upper framework 314. Deflection points may also exist at any point along the arms of the first lower framework 302 and the second lower framework 312. Deflection points may be positioned equidistant on either side of the vertex 550, 555 to give frameworks bilateral symmetry. Such configurations may allow the frameworks to be used in a left- or right-hand configuration. Such simplicity in component design may provide a cost savings in the manufacturing process.

As previously discussed, the moveable support structure may comprise a wheeled platform 200 placed on a track 210. The track 210 may comprise a pair of railroad tracks. A pair of adjacent train flat cars may rest upon the pair of railroad tracks and serve as the platform 200 that is moveable. Alternatively, a single platform may be configured to move upon a pair of railroad tracks. The single platform may have a width of approximately 9.75 meters (32 feet) and be placed on a pair of railroad tracks spaced apart approximately 4.88 meters (16 feet), as shown in FIG. 5. Referring back to FIG. 2, a clamp (not shown) may be mounted to the track 210 and the wheel 202 for holding down the apparatus 1000 when the hydrokinetic wheel 100 is in operation. Alternatively, the clamp may be mounted between the foundation and the platform 200 or the support structure 400.

Figure 6A:
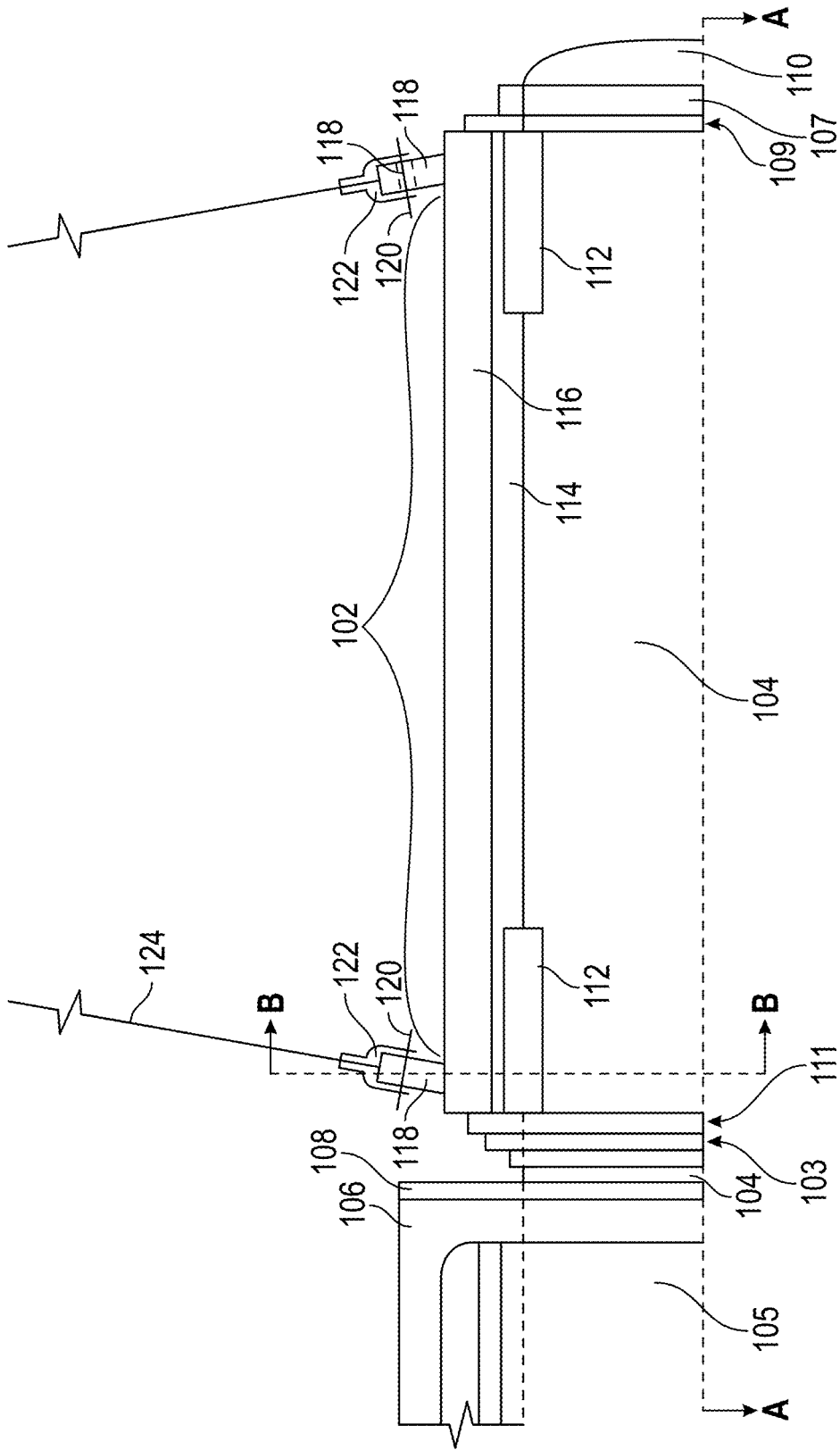
FIG. 6A shows cross-section A-A from FIG. 5 that depicts the hydrokinetic wheel-hub assembly of the hydrokinetic energy transfer apparatus.

Referring now to FIG. 6A, longitudinal cross-section A-A from FIG. 5 depicts half of the hydrokinetic wheel hub assembly of the apparatus 1000. FIG. 5 depicts a view across the wheel hub 102 that is perpendicular to the rotating axis of the wheel hub 102. The wheel hub 102 serves as a connection mechanism between the hydrokinetic wheel 100 and the rotating shaft 104. A thrust bearing 103, 107 may be secured to the outer face(s) of the wheel hub 102 to retain the wheel hub 102 along the rotating shaft 104. The rotating shaft 104 may pass through a hub bearing 109, 111 mounted within the wheel hub 102.

The wheel hub 102 may comprise an inner hub 114 and an outer hub 116 to provide a longer-lasting design. In combination, the inner hub 114 and outer hub 116 form a two-piece manufactured component. The two-piece hub may avoid deviations from specification standards that can occur with extensive welding and fitting in a one-piece design. The inner hub 114 may be removably fitted upon and keyed into the rotating shaft 104. A plurality of hub keys 112 may be mounted or welded between the rotating shaft 104 and the inner hub 114. Alternatively, the hub keys 112 may be made integral with either the rotating shaft 104 or the inner hub 114. The plurality of hub keys 112 may be positioned on lateral sides of the wheel hub 102. Alternatively, the plurality of hub keys 112 may extend along a longitudinal length of the wheel hub 102 from a left-hand to a right-hand side. An outer hub 116 may be mounted or welded to the inner hub 114 to provide an outer attachment structure for a plurality of spokes 124. The outer hub 116 may comprise flanges 118 to assist in attachment of the plurality of spokes 124. The outer hub 116 may be bonded to the inner hub 114 after flanges and rings are welded into place.

The flanges 118 may encircle the margins of the outer hub 116. The flanges 118 may extend outward radially away from the outer hub 116 at an acute angle relative to the cylindrical surface of the outer hub 116. An aperture 117 may be disposed through the flange 118. A brace 122 may be mounted or welded to the flange 118. Legs of the brace may be sized to accommodate and fit over the flange 118. Legs of the brace may be held in place with a pin 120 inserted through the legs and aperture 117 of the flange. The pin 120 may be held in place with a substantially sized safety device including a coupler pin, cotter pin, bolt with nut, locking pin, safety cap, retaining clip or ring. The brace 122 may be a clevis or yoke that joins with a spoke 124 such as a solid steel rod or metal cable. The brace 122 may have a threaded rod end that cooperatively joins with a threaded end of the spoke 124. A plurality of spokes 124 may connect between a rim assembly of the hydrokinetic wheel 100 and a plurality of braces 122 secured around the flange of the outer hub 116.

Figure 6B:
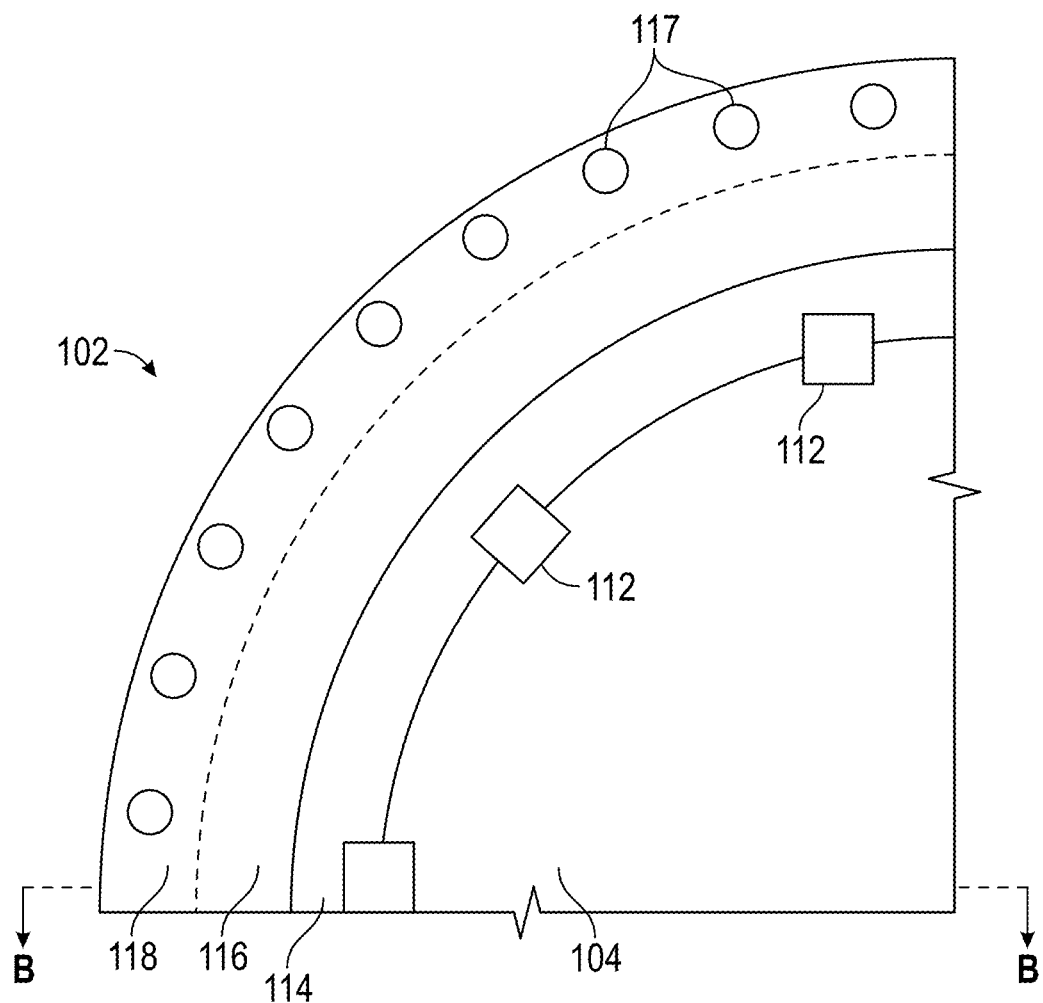
FIG. 6B shows cross-section B-B from FIG. 6A that depicts the wheel hub of the hydrokinetic wheel.

Referring now to FIG. 6B, transverse cross-section B-B from FIG. 6A depicts an inside portion of the wheel hub 102 of the hydrokinetic wheel 100. The rotating shaft 104 may be keyed into the inner hub 114 as previously mentioned. A rotating shaft 104 keyed into the inner hub 114 may be powered by rotation of the hydrokinetic wheel 100 when the wheel is engaged with a surface of the river 10. The inner hub 114 may be separately joined to the outer hub 116 or made integral with the outer hub 116. Alternatively, the wheel hub of the hydrokinetic wheel-hub assembly may be a singular hub component that encircles and keys into the rotating shaft 104. A plurality of apertures 117 may be spaced apart and disposed through the flange 118 for connection of an outer portion of the outer hub 116 with the spokes 124.

Figure 7A:
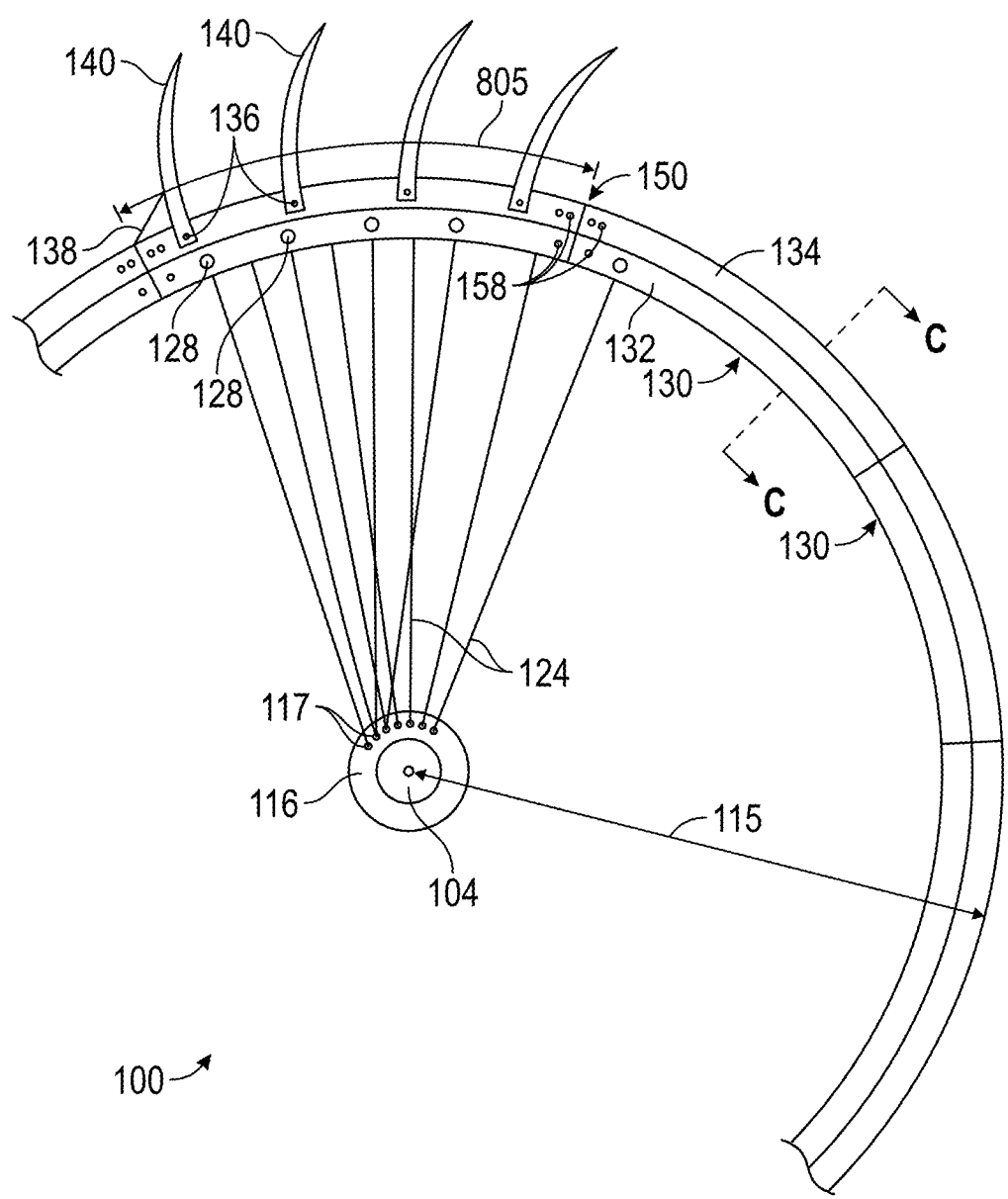
FIG. 7A shows a side view of the modular components of an example hydrokinetic wheel.

Referring now to FIG. 7A, a side view of an example hub-rim assembly of the hydrokinetic wheel 100 is shown. The rim assembly may comprise a kit of modular components including a plurality of paddles 140 (curved blades), rim sections 130, and spokes 124. In this example, the paddles 140 are adapted to mount directly to an outer flange 134 of the rim section 130. A paddle 140 may be attached to the rim section 130 with a fastener 136 of a type previously discussed. An inner flange 132 of the rim section 130 is shown interconnected with the plurality of spokes 124. A plurality of apertures 128 may be disposed through the rim sections 130. An aperture 128 may be used to attach with a terminal end of each spoke 124. In one example, nine curved rim sections are interconnected at rim section ends 150 to form a large rim assembly. As shown in FIG. 7A, approximately four paddles and eight spokes may be attached to a rim section 130. A support 138 or plurality of supports may brace a paddle 140 against the force of the free-flowing water surface of the river 10. Supports 138 may be a bar of metal tubing or other durable material. Supports 138 may be placed at an angle to be mounted between the rim section 130 and a backside of the paddle 140. Supports 138 may serve to stabilize the paddle in placement position.

Figure 7B:
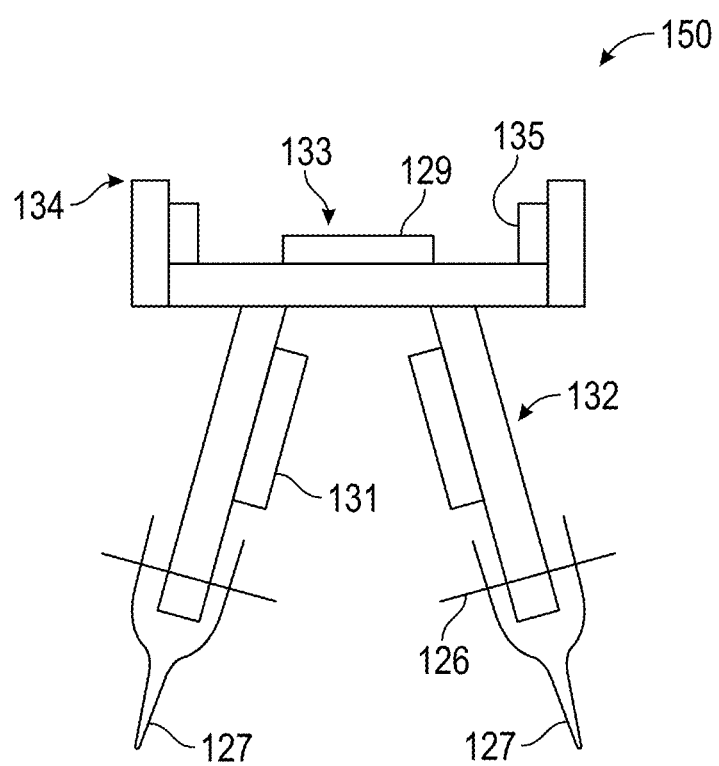
FIG. 7B shows cross-section C-C from FIG. 7A that depicts a rim section of the hydrokinetic wheel.

Referring now to FIG. 7B, transverse cross section C-C from FIG. 7A depicts a rim section end 150 with splice plates and braces 127 installed. Each of the rim sections 130 may have an inner flange 132, cross plate 133, and outer flange 134. The inner flange 132 may abut against end faces or an interior face of the cross plate 133. The inner flange 132 pair may extend outward away from the rim assembly at an acute angle relative to the interior face of the cross plate 133. The outer flange 134 may abut against the exterior face or end faces of the cross plate 133. The outer flange 134 may extend vertically away from the rim assembly at right angles relative to the cross plate 133.

Splice plates may include a cross splice plate 129, inner splice plate 131, and outer splice plate 135. Splice plates may span parallel and laterally adjacent with the cross plate 133, the inner flange 132, and outer flange 134 across rim section ends 150 of separate rim sections 130 joined together. A plurality of splice fasteners 158 (shown in FIG. 7A) may be passed through apertures disposed in the inner flange 132, the cross plate 133, the outer flange 134, and corresponding splice plates to secure rim section ends 150 together. The plurality of splice fasteners 158 may include retaining pins, rivets, or steel bolts with nuts. Alternatively, other fastening means might be used.

A brace 127 of the type previously discussed may be mounted or welded to the inner flange 132. Legs of the brace may be sized to accommodate or fit over the inner flange 132. The brace 127 may be held in place with a pin 126 inserted through the legs of the brace 127 and aperture 128 disposed through the inner flange 132. A tie rod end of the brace 127 may join with a terminal end of a spoke 124 as previously discussed.

Figure 7C:
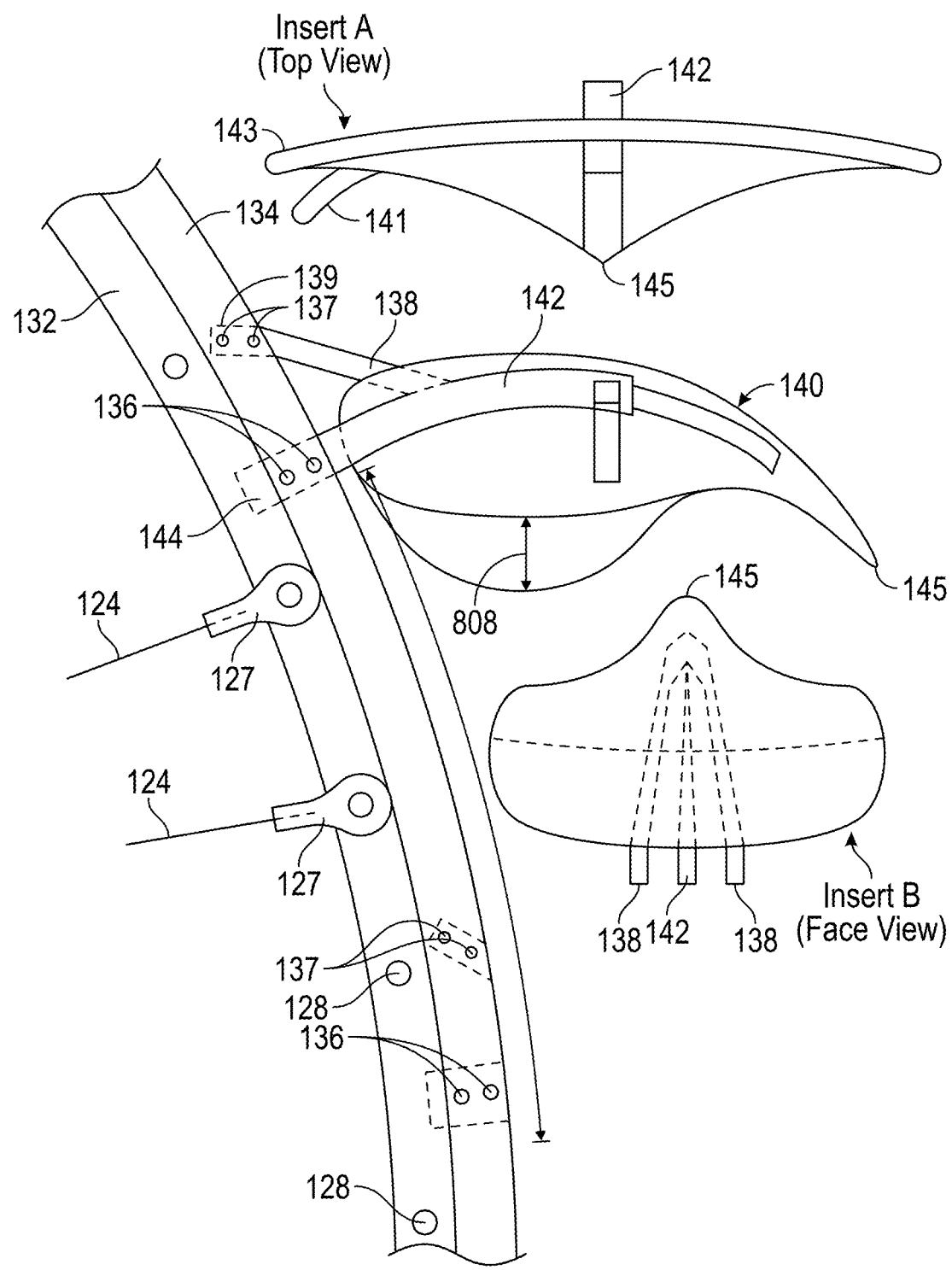
FIG. 7C shows a side view of a rim section supporting paddles of the current design.

Referring now to FIG. 7C, a close-up view of a rim section 130 disposed between a plurality of spokes 124 and paddles 140 of the current design is shown. The plurality of spokes 124 may connect between the hub assembly of the hydrokinetic wheel 100 and a plurality of braces 127 secured along the inner flange 132 of the rim assembly. The paddles 140 may be joined to the rim section 130 with a support 138 and a paddle shaft 142. An end of the support 139 may be joined to the outer flange 134 with fasteners 137 disposed through a plurality of apertures in the outer flange 134 and the end of the support 139. Paddle shafts 142 may be spaced equally apart. In the example shown, the paddle shafts are approximately 261.62 centimeters (103 inches) apart, on shaft center, along the rim section 130. A portion of the paddle shaft 142 may be joined to the outer flange 134 with fasteners 136 disposed through a plurality of apertures in the outer flange 134 and an end of the paddle shaft 144. Alternatively, the end of the paddle shaft 144 may pass through the rim cross plate 133 and secured. A tip 145 of the paddle 140 may be curved or pointed. A wing of the paddle 140 may be arcuately curved with either a steep radial arc 141 or a shallow radial arc 143. The separation distance between the edge of a wing having a steep radial arc 141 versus a shallow radial arc 143 is shown with arrow 808. Selection between a steep or shallow wing for the paddle 140 may be dependent on the size, volume, or flow rate of the free-flowing water source available.

As mentioned previously, determining the amount of rim sections 130 and paddles 140 utilized may depend on the output size of the hydrokinetic wheel 100 selected. The output size of the hydrokinetic wheel 100 may be based on the size, volume, or flow rate of the free-flowing water source available. The rim assembly utilized for a hydrokinetic wheel 100 may have a diameter of approximately 30.02 meters (98.5 feet) and a circumference of approximately 94.34 meters (309.5 feet). In this case, each of the rim sections 130 may be approximately 10.48 meters (34.39 feet) in length having an arc of approximately 40 degrees. As shown in FIG. 7A, the length of each rim section 130, as represented by length arrow 805, may be dependent on the diameter 115 or circumference of the hydrokinetic wheel 100 selected.

In one example, a hydrokinetic wheel 100 may have a diameter of approximately 30.5 meters (100 feet) and a circumference of approximately 95.7 meters (314 feet). In this case, 36 paddles may encircle the circumference of the hydrokinetic wheel 100. A paddle 140 may be approximately 5.5 meters (18 feet) wide by 2.5 meters (8 feet) tall. Approximately 9 paddles may be concurrently interfaced with continuous free-flowing water when 25% of the circumference of the hydrokinetic wheel 100 is in contact with the non-tidal water. Free-flowing water in contact with paddles 140 having these dimensions may equate to 102 cubic meters (3,600 cubic feet) of moving water interfaced. Therefore, approximately 102,875 kilograms (226,800 pounds) in weight of water may drive the paddles 140 interfaced. Free-flowing water having a low speed such as 0.25 meters/second may drive the hydrokinetic wheel 100 to convert approximately 188 kilowatts (kW) of energy from the free-flowing river. Free-flowing water having a medium speed such as 2.5 meters/second may drive the hydrokinetic wheel 100 to convert approximately 248 kW of energy from the free-flowing river.

In one example, a hydrokinetic wheel 100 may have a diameter of approximately 54.9 meters (180 feet) and a circumference of approximately 172.2 meters (565 feet). In this case, 54 paddles may encircle the circumference of the hydrokinetic wheel 100. A paddle 140 may be approximately 8.5 meters (28 feet) wide by 3.7 meters (12 feet) tall. Approximately 14 paddles may be interfaced with free-flowing water assuming 25% of the circumference of the hydrokinetic wheel 100 is continuously in contact with the water when in the lowered position. Free-flowing water in contact with paddles 140 having these dimensions may equate to 428 cubic meters (15,120 cubic feet) of moving water interfaced. Therefore, approximately 432,073 kilograms (952,560 pounds) in weight of water may drive the paddles 140 interfaced. Free-flowing water having a low speed such as 0.25 meters/second may drive the hydrokinetic wheel 100 to convert approximately 0.9 megawatts (MW) of energy from the free-flowing river. Free-flowing water having a medium speed such as 2.5 meters/second may drive the hydrokinetic wheel 100 to convert approximately 2.1 MW of energy from the free-flowing river.

In another example, a hydrokinetic wheel 100 may have a diameter of approximately 73.2 meters (240 feet) and a circumference of approximately 229.8 meters (754 feet). In this case, 72 paddles may encircle the circumference of the hydrokinetic wheel 100. A paddle 140 may be approximately 11 meters (36 feet) wide by 4.9 meters (16 feet) tall. Approximately 18 paddles may be interfaced with free-flowing water assuming 25% of the circumference of the hydrokinetic wheel 100 is continuously in contact with the water when in the lowered position. Free-flowing water in contact with paddles 140 having these dimensions may equate to 978.6 cubic meters (34,560 cubic feet) of moving water interfaced. Therefore, approximately 987,597.6 kilograms (2,177,280 pounds) in weight of water may drive the paddles 140 interfaced. Free-flowing water having a low speed such as 0.25 meters/second may drive the hydrokinetic wheel 100 to convert approximately 1.8 MW of energy from the free-flowing river. Free-flowing water having a medium speed such as 2.5 meters/second may drive the hydrokinetic wheel 100 to convert approximately 3.6 MW of energy from the free-flowing river.

A foundation surface 12 may be provided for the apparatus. The foundation surface 12 may be concrete, pavement, ballast, or other sturdy material founded beneath the apparatus 1000. The foundation surface 12 may provide stability to the apparatus 1000, especially when apparatus 1000 is placed on an existing subsurface 16 such as loose alluvial soil.

A foundation subsurface 14 of crushed gravel, clay, or other packable material may be used underneath the foundation surface 12. Foundation pillars 20 disposed underneath the foundation surface 12 and placed within the subsurface 16 may provide vertical support to the foundation surface 12. Foundation footings 22 located at terminal ends of the foundation pillars 20 placed within the subsurface 16 help to maintain the elevation level of the foundation surface 12 through settling.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

I claim:

1. An apparatus that interfaces with non-tidal flowing water comprising:
   a. a support structure;
   b. a first framework that is angled and pivotally mounted to the support structure, the first framework comprises:
      i. a first end;
      ii. a second end;
      iii. a vertex between the first end and the second end;
   c. a bearing rotatably mounted between the first framework and the support structure at the vertex;
   d. a hydrokinetic wheel connected to the first end;
   e. a counterbalance connected to the second end; and
   f. wherein the first framework is adapted to pivot and move the hydrokinetic wheel and the counterbalance in opposite vertical direction about the vertex.

2. The apparatus of claim 1, wherein the first framework further comprises:
   a. a first arm extending from the bearing towards the first end;
   b. a second arm extending from the bearing towards the second end; and
   c. wherein the first arm and the second arm form an angle that is obtuse.

3. The apparatus of claim 2, wherein the first end and the second end are maintained above the bearing between a lowered position and a raised position.

4. The apparatus of claim 2, further comprising:
   a. a linear actuator mounted to the support structure and the first arm.

5. The apparatus of claim 2, wherein the first end is horizontally aligned with the bearing when the first arm is in a lowered position and the second end is horizontally aligned with the bearing when the first arm is in a raised position.

6. The apparatus of claim 1, wherein the axis of rotation of the first framework is horizontal and perpendicular to the axis of rotation of the hydrokinetic wheel.

7. The apparatus of claim 1, wherein the first framework is adapted to maintain the hydrokinetic wheel in vertical alignment while raising and lowering the hydrokinetic wheel.

8. The apparatus of claim 1, further comprising:
   a. a first linkage connecting the hydrokinetic wheel to the first end of the first framework; and
   b. wherein the first linkage is configured to maintain the hydrokinetic wheel in vertical alignment when the first framework pivots.

9. The apparatus of claim 1 further comprising:
   a. a first linkage connecting the first end of the first framework to the hydrokinetic wheel; and
   b. a shaft powered by the hydrokinetic wheel, wherein the shaft passes through the first linkage and maintains horizontal alignment within the first linkage when the first framework pivots.

10. The apparatus of claim 1, further comprising:
    a. a generator mounted to the support structure; and b. a shaft operably connected between the hydrokinetic wheel and the generator, wherein the shaft extends in a general linear direction when the hydrokinetic wheel is in a lowered position and extends in a non-linear direction when the hydrokinetic wheel is in a raised position.

11. The apparatus of claim 1, wherein the first framework forms a concave quadrilateral shape with at least one end of the first framework angled upward from the vertex when the hydrokinetic wheel is in a lowered position and a raised position.

12. The apparatus of claim 1, further comprising:
  a. a second framework that is angled and pivotally mounted to the support structure, wherein the second framework is vertically displaced from the first framework to form a double chevron shape.

13. The apparatus of claim 1 further comprising:
  a. a wheeled platform connected to and disposed below the support structure, wherein the wheeled platform is adapted to move the apparatus upon a pair of tracks extending perpendicular to a flow path of a river.

14. The apparatus of claim 1, wherein the counterbalance is up to 15 percent greater in weight than the hydrokinetic wheel.

15. An apparatus that interfaces with non-tidal flowing water comprising:
  a. a support structure comprising:
    a. a platform;
    b. wheels connected to the platform;
  b. a first framework that is angled comprising:
    i. a first arm;
    ii. a second arm;
    iii. a bearing disposed at a vertex between the first arm and the second arm, the bearing mounted to the support structure below a first end and a second end of the first framework;
  c. a hydrokinetic wheel connected to the first arm;
  d. a counterbalance connected to the second arm; and
  e. a first hydraulic actuator operably connected between the first framework and the support structure.

16. The apparatus of claim 15, wherein the first hydraulic actuator is mounted to the platform and the first arm.

17. The apparatus of claim 15, wherein the support structure is at least one train flatcar adapted to move on tracks mounted to the ground.

18. The apparatus of claim 15, further comprising:
  a. a shaft connected to a hub of the hydrokinetic wheel, the shaft having an axis of rotation that is perpendicular to a horizontal axis of rotation of the first framework.

19. The apparatus of claim 15, further comprising:
  a. a rim assembly of the hydrokinetic wheel formed by a plurality of interconnectable rim sections; and
  b. a plurality of paddles mounted to the interconnectable rim sections, wherein a paddle of the plurality of paddles is between 2.5 meters and 5 meters tall and between 5 meters and 10 meters wide.

20. The apparatus of claim 15, wherein the length of the first arm is between 20 meters and 50 meters, and the diameter of the hydrokinetic wheel is between 25 meters and 75 meters.

\* \* \* \* \*